United States Patent [19]

Clarström et al.

[11] Patent Number: 5,407,103

[45] Date of Patent: Apr. 18, 1995

[54] APPARATUS FOR DISCHARGING PARTICLE MATERIAL

[75] Inventors: Bo Clarström, Kil; Lennart Jonsson; Finn Oulie, both of Karlstad, all of Sweden

[73] Assignee: Kamyr Aktiebolag, Karlstad, Sweden

[21] Appl. No.: 117,077

[22] PCT Filed: Mar. 16, 1992

[86] PCT No.: PCT/SE92/00160

§ 371 Date: Sep. 9, 1993

§ 102(e) Date: Sep. 9, 1993

[87] PCT Pub. No.: WO92/16442

PCT Pub. Date: Oct. 1, 1992

[30] Foreign Application Priority Data

Mar. 18, 1991 [SE] Sweden .................................. 9100815

[51] Int. Cl.$^6$ ............................................. B65G 65/30
[52] U.S. Cl. ................................... 222/409; 222/252; 222/233; 222/414
[58] Field of Search ..................... 222/233–238, 222/409, 342, 414, 252

[56] References Cited

U.S. PATENT DOCUMENTS 2,896,824  7/1959  Sheldon ........................... 222/236 X
4,043,488  8/1977  Halvorsen et al. ............. 222/234 X
4,129,234  12/1978  Conca ................................. 222/235

FOREIGN PATENT DOCUMENTS 0247682  2/1987  European Pat. Off. .
3811656  10/1989  Germany ............................ 222/233
129085  2/1974  Norway .
948444  2/1964  United Kingdom .
1409542  7/1988  U.S.S.R. ............................. 222/236

Primary Examiner—Andres Kashnikow
Assistant Examiner—Anthoula Pomrening
Attorney, Agent, or Firm—Cushman, Darby & Cushman

[57] ABSTRACT

A device for discharging particulate material from a container with a table to support the particulate material includes a feed unit which is movable on the table for discharging the material through a peripheral outlet opening, and a drive for driving the feed unit; the feed unit includes at least two spaced feeding elements disposed to successively move the material in a direction from the center of the table towards the outlet opening; the feeding elements are arranged, during a full cycle of movement of the feed unit, to be alternately active within an arbitrary section of the table extending between the center part and outlet opening for feeding a layer of particulate material in front of them in the direction toward the outlet opening and inactive while returning to a starting position.

16 Claims, 5 Drawing Sheets

APPARATUS FOR DISCHARGING PARTICLE MATERIAL

FIELD OF THE INVENTION

The present invention relates to a means for discharging particle material from a container, preferably having circular cross section, with a bottom in the form of a fixed table to support the particle material in the container, said means comprising a feed unit which is movable in relation to the table and disposed close to the upper side of the table, for discharging the particle material from the container through an outlet means, and drive means for driving the feed unit, said feed unit having substantially vertical feeding surfaces facing the outlet means, said outlet means comprises at least one substantially horizontal outlet opening, extending around at least the main part of the table at a distance from its center and which is defined along at least one side by an edge of the table, said feeding surfaces of the feed unit extending all around the table, and said feed unit being arranged to be moved by said drive means during a cycle of movement with altered directions of feed towards the outlet opening so that during the cycle of movement particle material is fed out to substantially all parts of said outlet opening, and also so that the area of the feeding surfaces which is active for feeding is substantially constant throughout the cycle of movement.

BACKGROUND OF THE INVENTION

Description of the Prior Art

A number of devices have been suggested for feeding out particle material, such as movable arms or blades which rotate or oscillate to and fro and are usually intended for use in combination with one or more screws. It is also usual to use only a screw arrangement to feed out the material. Other examples are feeders with slats or scrapers which bring with them the material to an outlet opening, the slats or scrapers may move to and fro or they may be disposed on a continuous belt. A problem encountered with most known feeding devices is that they do not give a uniform flow of material down through the container seen in cross section. Instead the flow may be greater on one side than on the other or the flow in the middle of the container may differ from that at the walls. The problem is particularly serious when the material is to be treated with a treating agent in gaseous or liquid form at or without increased temperature since the quality of the material will be uneven due to the fact that it will be treated for varying lengths of time as a result of varying flow rates seen in a cross section of the container. An example of such an application is in the pulp industry when steaming chips. Before being fed into a digester the chips are treated with steam in a chip bin in order to heat the chips to a desired high temperature and at the same time to remove air from the interior of the chips. It will be understood that with the varying flow rates described in the chip bin, the steamed chips fed out will vary in quality so that the chips will have different temperatures and varying amounts of retained air.

GB-948 444, NO-129 085 and EP-A1-0 247 682 describe various devices for discharging particle material. The known devices have one or more of the drawbacks discussed above. EP-A1-0 247 682 is not useful for chips, either, since it utilizes eccentric rings which feed the material in two opposite directions towards adjacent outlet openings at both sides of each ring. Owing to the oblong thin shape of the chip it is not possible to repeatedly change its feeding direction when a uniform flow is to be obtained.

SUMMARY OF THE INVENTION

The object of the present invention is to essentially reduce the above-mentioned problem and provide a means discharging the material in such a manner that the flow in the container becomes more uniform in a cross section through the column of material. Bases are thus created for achieving a more uniform quality in the material fed out of the container and which is treated in the container with a suitable fluid, e.g. steam or moist, heated air.

The invention is substantially characterized in that said feed unit comprises at least two spaced feeding elements disposed to successively move the material in direction from the center part of the table towards the outlet opening, and that said feeding elements are arranged, during a full cycle of movement of the feed unit or a part of the cycle of movement, to be alternately active within an arbitrary section of the table extending between the center part and outlet opening for feeding layer of particle material in front of them in the direction to the outlet opening, and inactive while returning to a starting position.

One of said feeding elements is thus centrally located and it has a relatively small horizontal extension (corresponding to the diameter in the case of a circular table) so that also particle material in the center of the table can be fed therefrom by the central feeding surface to the next feeding element. As indicated the material is fed successively in said direction towards the outlet opening which means that the table surface is whole, i.e. without any apertures or gaps, between two adjacent feeding elements. Thus, material which is fed by an inner feeding element will be fed further in the same direction by the next, feeding element together with further material adjacent the last-mentioned feeding element. It is understood that each feeding element has only one feeding surface and that this feeding surface faces to the periphery of the table.

BRIEF DESCRIPTION OF THE DRAWINGS

The invention will be described further in the following with reference to the accompanying drawings.

DETAILED DESCRIPTION OF THE INVENTION

Figure 1:
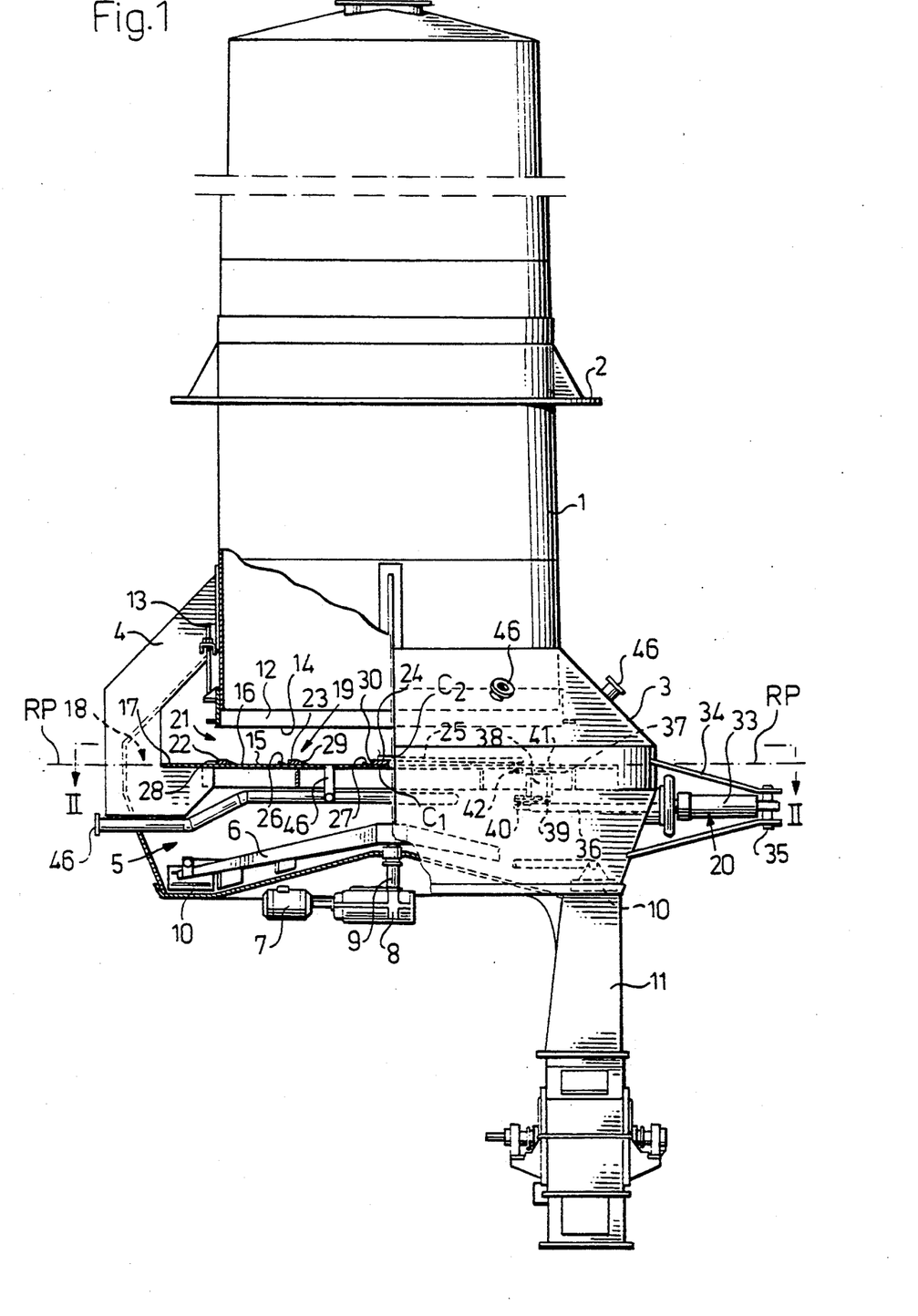
FIG. 1 is a side view of a container with a means for feeding out material in accordance with a first embodiment of the invention.

FIG. 1 shows the lower part of a vertical cylindrical container which may be rigidly mounted onto a floor in a building or onto a stand by means of an attachment means 2. Particle material is supplied at the top of the container through supply means (not shown). At the lower end of the container is an enlarged housing 3 which is considerably larger in diameter than the container 1—at least within the area of a horizontal reference plane RP. The housing is secured to the container 1 by a number of brackets 4, and encloses an outlet chamber 5 with a scraping device 6 arranged at the bottom. The scraping device 6 is driven by a motor 7 disposed below the housing. Via a suitable gear 8 the motor drives a vertical shaft 9 which extends through the bottom wall of the housing and drives the scraping device 6 which is provided with a plurality of scrapers 10. A chute 11 is connected to the housing 3 at a peripheral point of the bottom wall, so that the material carried along with the scrapers 10 is conveyed down into the chute 11.

The orifice of the container 1 is located in or immediately above the outlet chamber 5. The lower end portion of the container is formed by a cylindrical ring 12 which is slidably movable on the outside of the container and can be adjusted vertically by means of a plurality of adjusting means 13. The position of the lower horizontal edge 14 of the container can thus be adjusted in relation to said reference plane RP. A horizontal, circular table 15 is also arranged in the outlet chamber 5 and secured to said brackets 4. The upper surface 16 of the table 15 coincides with said reference plane RP and defines a vertical, circular outlet gap 21 with the edge 14 of the container. The size of the gap 21 is thus regulated with the adjusting means 13. The diameter of the table 15 is larger than that of the container 1 measured at its lower edge 14 so that a sufficiently large outer part 17 is formed which is located radially outside the imagined extension of the container as indicated by a reference circle RC in FIG. 2. The outer part 17 is intended to take up material with a certain angle of repose. The diameter of the table 15 is less than that of the housing 3 measured at said reference plane RP, so that a sufficiently large horizontal gap-shaped outlet opening 18 is formed between the periphery of the table 15 and the inner side of the housing 3. This outlet gap 18 is thus circumpherential or continuous apart from the interruptions caused by the brackets 4. In the preferred embodiment shown the table is free from outlet gaps since such inner gaps would permit material to fall down therethrough from the column of material located above the table without controlled feeding resulting in an uneven flow.

Figure 2:
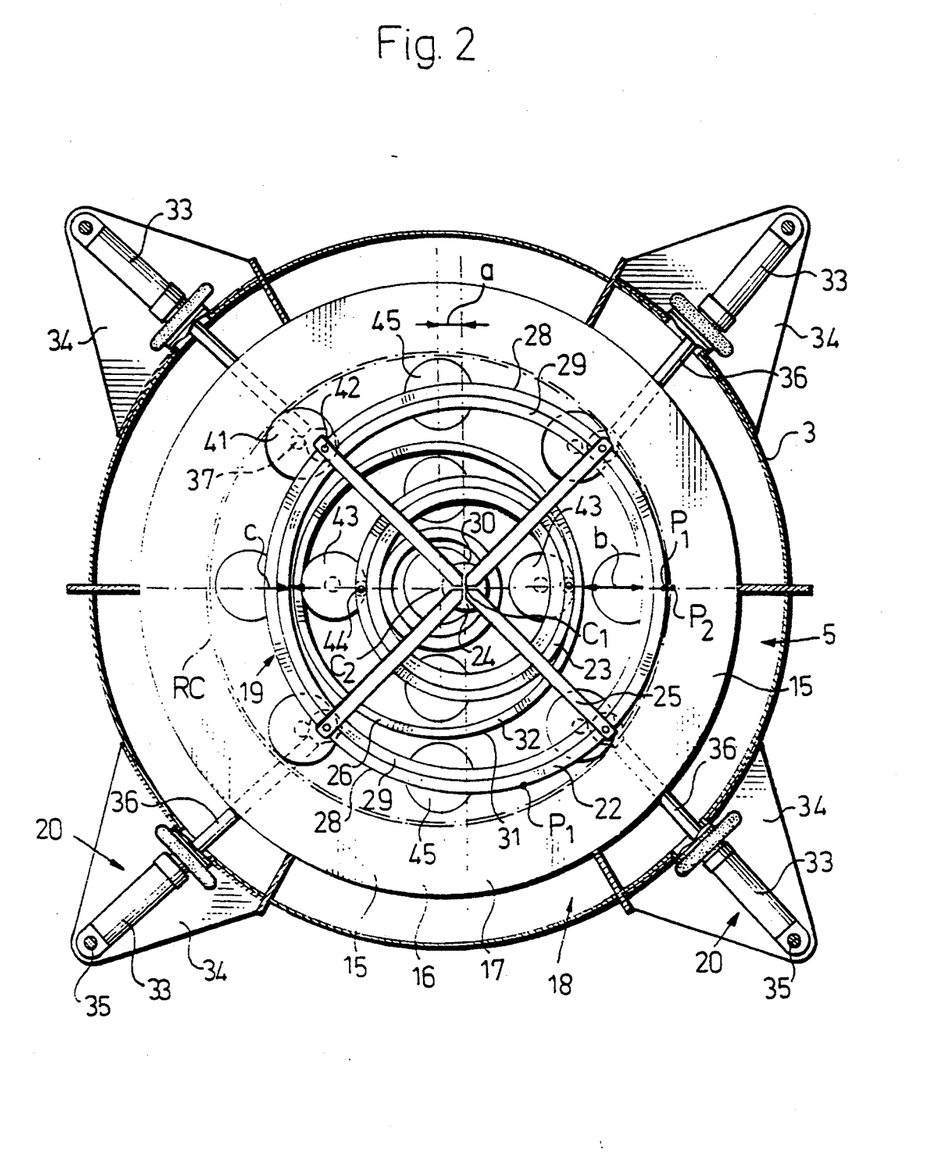
FIG. 2 is a section along the line II—II in FIG. 1.

The housing 3 disposed below the container 1 is provided with a special discharging device comprising a feed unit 19 movable in a plane parallel with the upper surface 16 of the table, a drive means 20 to effect movement of the feed unit 19, and a plurality of stationary, circular counter-rings 26, 27. In the embodiment shown the movable feed unit 19 consists of a plurality of feeding elements in the form of two concentric, circular feeding rings 22, 23, and a circular feeding disc 24 disposed at the center $C_1$ of the feeding rings. The feeding disc 24 and the two feeding rings 22, 23 are joined together by connecting arms placed in the form of a cross. The movable feed unit 19 is disposed eccentrically above the table in relation to its center $C_2$. The eccentric displacement a i.e. the distance between $C_1$ and $C_2$, is predetermined. In the embodiment shown two counter-rings 26, 27 are used which are concentric with the circular table 15 and secured to its upper surface 16.

The inner, fixed counter-ring 27 is surrounded by the inner, movable feeding ring 23, which in turn is surrounded by the outer counter-ring 26. The greatest distance b between the movable feeding ring/feeding disc 22, 23, 24 and the nearest stationary counter-ring 26, 27, respectively, is slightly greater than twice the distance a so that frictional contact is prevented when the distance between the movable feeding ring/feeding disc 22, 23, 24 and a nearest stationary counter-ring 26, 27, respectively, assumes its smallest value, which smallest distance can be designated c. The following equation thus applies:

$$b=2a+c.$$

The movable feeding rings 22, 23 have a forward, substantially vertical feeding surface 28 which thus faces radially outwards towards the periphery of the table 15 and towards the outlet gap 18, and a rear, inclined slide surface 29 which thus faces towards the center $C_2$ of the table, whereas the inner feeding disc 24 is provided with a corresponding, substantially vertical feeding surface 30. The stationary counter-rings 26, 27 are provided with a forward, substantially vertical counter surface 31 which thus faces radially outwards towards the periphery of the table, and a rearwardly inclined slide surface 32 which thus faces towards the center $C_2$ of the table. The slide surfaces 29, 32 allow material to pass more easily over the various rings upon relative movement between them and the material. Thus, the slide surfaces 29, 32 prevent the material to be moved in an opposite direction with respect to the feeding direction desired.

The driving means for moving the feed unit 19 comprises four pneumatic or hydraulic cylinders 33, pivotably mounted on brackets 34 on the outside of the housing 3 by means of vertical pins 35. The cylinders are directed substantially radially with the table 15 and their piston rods 36 extend through sealed openings in the wall of the housing 3, into the outlet chamber 5 beneath the table 15 to a position within the area covered by the outer feeding ring 22 on the upper surface 16 of the table. For each cylinder the drive means includes an eccentric drive member having a vertical shaft 37 rotatably journalled by means of a bearing 38 mounted in the table. At the lower end of the shaft 37 is a horizontal arm 39 for eccentric, pivotable journalling of the piston rod 36 by means of a vertical lower pin 40. The upper end of the shaft 37 is secured to a circular plate 41 at its center, the plate 41 being received in a corresponding recess in the table and being rotatably journalled in the recess. An upper vertical pin 42 is disposed at the periphery of the plate 41 for eccentric, pivotable journalling of the outer feeding ring 22 in relation to the plate 41. The upper pin 42 is axially aligned with the lower pin 40. The rotatable plates 41 are displaced 90° in relation to each other around the table 15 and at the same distance from the center $C_2$ of the table so that they internally touch said reference circle RC. The eccentric journalling point, formed by the upper pin 42, of the outer feeding ring 22 on a plate 41 is displaced 90° in relation to the journalling point 42 on the following or preceding plate 41 seen in the circumference of the table and seen in relation to the radius of the table 15 which intersects the center of each plate 41. Switching in of the cylinders 33 is governed by a control device with position transducers so that the cylinders 33 are connected in alternately or intermittently in accordance with a specific sequence to withdraw each piston rod 36 when the eccenter pin 42 on the rotating plate 41 moves towards the outlet gap 18. With the aid of the cylinders 33, which are suitably single-acting cylinders, all four plates 41 will rotate continuously and, thanks to the eccentrically placed pins 42 with mutually different positions on the plates 41, the outer feeding ring 22 will move a corresponding eccentric circular movement in relation to the center $C_2$ of the table. The radius of the eccentric circular movement thus corresponds to the distance between the center of the plate 41 and the upper pin 42 and also said distance a. The feed unit is thus prevented from rotating about its own center $C_1$ since the eccentric drive members are peripherally connected to the feed unit. When each arbitrary point $P_1$ on the feeding surface 28 of the outer feeding ring 22 is nearest said reference circle RC and opposite an imagined fixed point $P_2$ thereon, this point $P_1$ will describe a circle during the eccentric circular movement of the outer feeding ring 22 corresponding to the circle described by the eccentrically placed pin 42 on each plate 41. In other words, the process can be described as epicyclic since the outer feeding ring 22 will move around inside the reference circle RC. Since the inner feeding ring 23 and the central feeding disc 24 are permanently connected to the outer feeding ring 22, they will move in a corresponding manner. In other words, without rotating about its own center $C_1$, the feed unit 19 will move with its center $C_1$ in a circle, the center of which coincides with the center $C_2$ of the table and which has a radius a. Two more rotatably journalled plates 43 are provided in recesses in the table in conjunction with the inner feeding ring 23 which, with the aid of pins 44 is eccentrically pivotably connected to the plates 43. A plurality of sliding plates 45 are also secured at several places on the table 15 to support the feed unit 19 and reduce the friction during its circular movement.

The shown container with its discharging device constitutes a chip bin for steaming chips. For this purpose the housing 3 is provided with a plurality of connections 46 for the supply of steam or pre-heated moist air which penetrates up through the chip bed in the bin 1.

Figure 3:
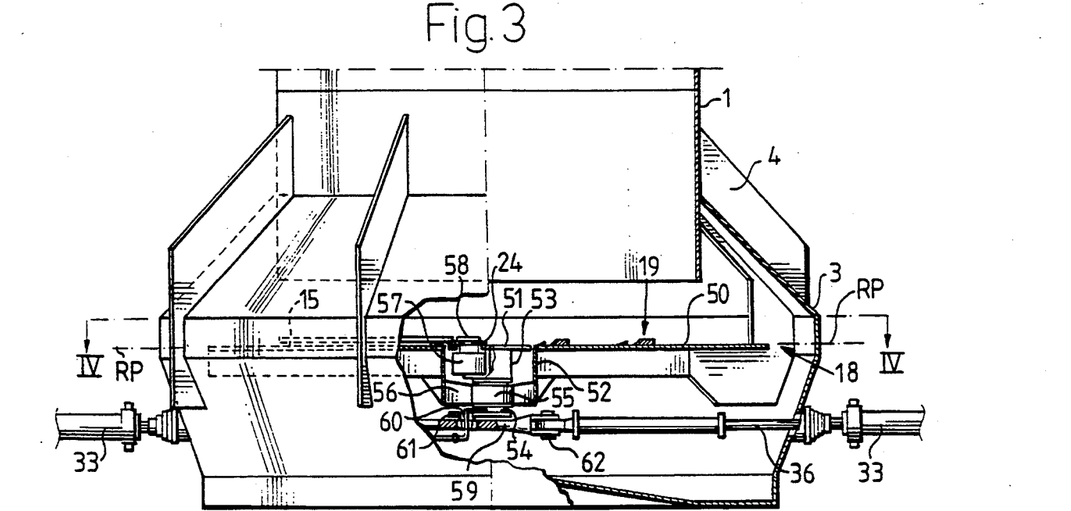
FIG. 3 is a side view of the lower part of a container provided with a means according to a second embodiment of the invention.
Figure 4:
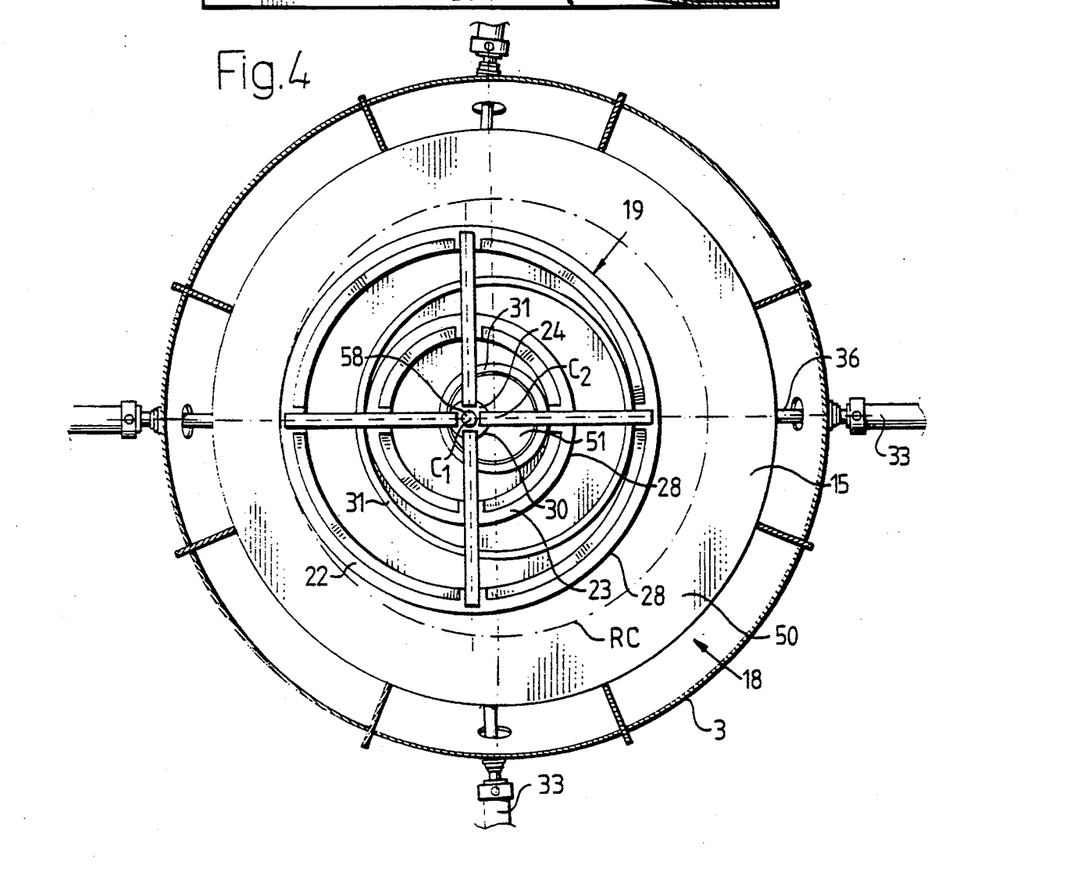
FIG. 4 is a section along the line IV—IV in FIG. 3.

FIGS. 3 and 4 show another embodiment of a discharging device according to the invention. The main difference from the embodiment shown in FIGS. 1 and 2 is that the means comprises a single eccentric drive means and that this is disposed below the table 15 in its central portion. The table 15 consists of an outer, larger, stationary part 50 and a centrally located part 51 which closes an assembly housing 52 and is rotatable. The central table part 51 is supported; by a sleeve 53 secured to a rotatable shaft 54, the center line of which coincides with the center $C_2$ of the table. The shaft 54 is journalled in a bearing 55 which is secured by brackets 56 to the assembly housing 52, the latter supporting the entire eccentric drive means. The rotatable sleeve 53 carries a bearing sleeve 57 for a vertical, upper, eccentric pin 58 placed eccentrically in relation to the center $C_2$ of the table and joined to the feeding disc 24 of the feed unit 19. This connection may advantageously be pivotable so that the feed unit can be allowed to pivot about its bearing shaft at the pin 58 while at the same time performing the eccentric circular movement. The four piston rods 33 are flexibly connected by vertical pins 62 to a horizontal connecting piece 59, a vertical lower pin 60 being journalled in the connecting piece 59 and in a horizontal connecting arm 61 permanently connected to the lower end of the central shaft 54. The upper and lower eccentrically placed pins 58, 60 are axially aligned with each other. The hydraulic cylinders 33 are activated in the same manner as described above, in a controlled sequence one after the other so that the lower eccentric pin is moved in a circle and turns about the shaft 54, the rotation of which causes the upper pin 58 to move in a corresponding circular path around the center $C_2$ of the table, whereby the central part 51 of the table is also rotated and the feed unit 19 is moved in an eccentric circular movement as described above. The table 15 may be provided with sliding plates for the feed unit 19 as described previously.

Figure 5:
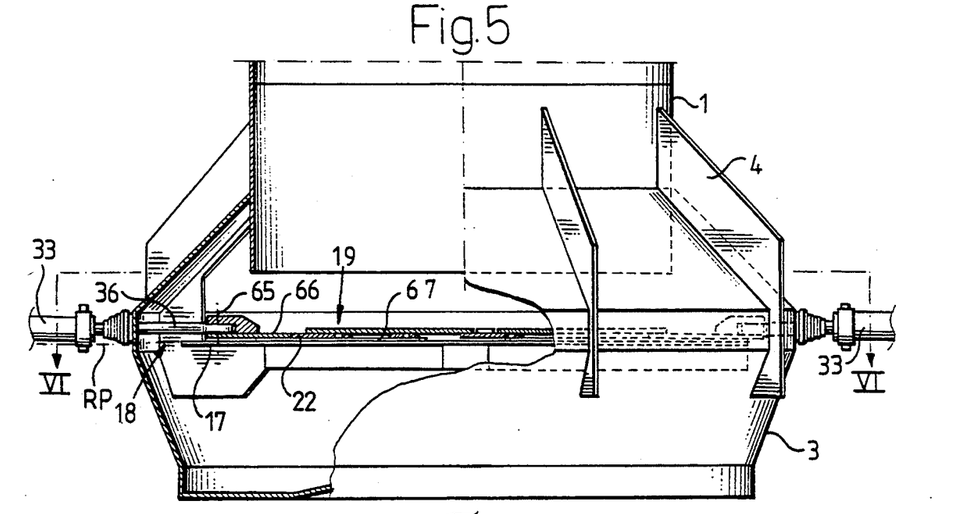
FIG. 5 is a side view of the lower part of a container provided with a means according to a third embodiment of the invention.
Figure 6:
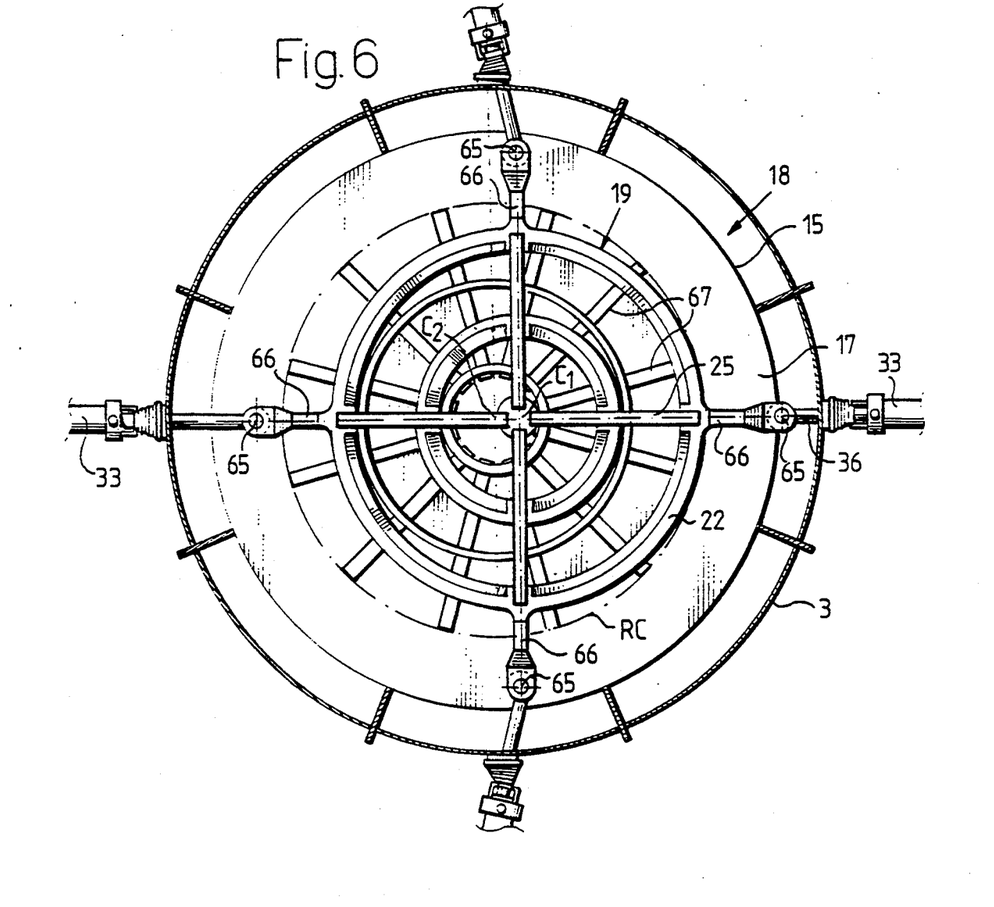
FIG. 6 is a section along the line VI—VI in FIG. 5.

FIGS. 5 and 6 show another embodiment of a discharging device according to the invention. The main difference from the embodiment shown in FIGS. 1 and 2 is that the hydraulic cylinders 33 are arranged above the table 15 so that the pistons 36 can be flexibly connected to the feed unit 19 without any intermediate eccentric drive means which would have to pass vertically through the table. The flexible connections between piston rods 36 and feed unit 19 are provided by vertical pivot pins 65 which can advantageously be arranged within the area of the outer part 17 of the table to avoid being influenced by the pressure from the column of material in the container. For this purpose the feed unit 19 is provided with radial pivot arms 66 for flexible connection with the piston rods 36 via said pivot pins 65. The pivot arms 66 are suitably arranged in the extension of, or constitute extensions of the connecting arms 25 mounted in a cross. The eccentric circular movement of the feed unit 19 is provided by selecting different relative positions for the pivot pins 65 in relation to the center $C_2$ of the table, for instance. The pivot pins 65 describe the same circular movement as the pins 42 in the first embodiment and are therefore at different points along such a circle, with the same 90° displacement as shown in FIG. 2. It will be understood that the piston rods 36 protrude different distances from their hydraulic cylinders 33 and in different directions in relation to the table 15. The hydraulic cylinders 33 are connected intermittently in order to alternately pull the feed unit 19 towards them so that the unit and its outer feeding ring 22 follows the reference circle RC which is concentric with the table. The feed unit 19 will thus execute an eccentric circular movement with respect to the center $C_2$ of the table, in the same way as in the embodiments described above, in order to continuously feed material from the center $C_2$ of the table 15 out towards the outlet gap 18. In all the embodiments shown, therefore the flow of material which is fed out from the table and falls down through the outlet gap 18 will move continuously around the outlet gap 18 and will always be located opposite the area of the outer feeding ring 22 located nearest and approaching said reference circle RC. Instead of sliding plates like those used in the embodiment according to FIG. 2, a plurality of radial sliding rods 67 are rigidly mounted on the upper surface of the table to support the feed unit and reduce friction against the table.

Figure 7:
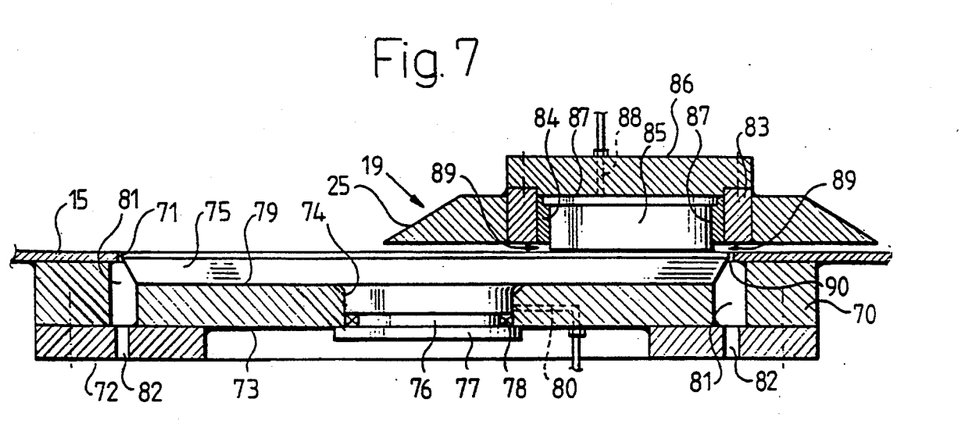
FIG. 7 is a section through an arrangement with sliding plate for reducing the friction between the feed unit and the table.

FIG. 7 shows a suitable embodiment of a device for reducing the friction between the feed unit 19 and the table 15, which device can be mounted at several points on the table. An assembly ring 70 is welded to the lower side of the table to surround a circular opening 71 in the table. A bottom ring 72 is screwed to the assembly ring 70 and carries a support plate 73 which is welded to the bottom ring 72 and is provided with a central aperture 74. A sliding plate 75 is located in the opening 71 in the table 15, this plate resting on the support plate 73 and having a central pin 76 which is received in the central aperture 74 of the support plate 73. The aperture 74 is closed from below by a lid 77 and a seal 78 is placed inside the lid 77 to seal between the support plate 73 and the central pin 76 of the sliding plate. The opposing surfaces of the sliding plate 75 and support plate 73 form sliding bearing surfaces 79 which are provided with grease from a central lubricant aggregate via a channel 80. Excess grease penetrates out to an annular space 81 located radially outside the support plate and sliding plate. A plurality of small holes 82 in the support ring communicate with the space 81, which allow grease to be pressed out thus indicating that the space 81 is entirely filled with grease. A recess is provided in the connecting arm 25 located above the sliding plate 75, this recess containing an assembly ring 83 welded to the connecting arm 25 and a bushing 84 inside the ring, the bushing in turn surrounding a cylindrical sliding roller or plate 85. The sliding roller is arranged eccentrically in relation to the sliding plate 75. The sliding roller 85 is enclosed by a lid 86 welded to the assembly ring 83 and rests on the upper surface of the sliding plate 75. During normal operation it is prevented from rotating about its vertical central axis by the friction engagement occurring between the two cooperating surfaces caused by pressure from the material in the container 1. The opposing surfaces of the sliding roller 85 and lid 86 and the bushing 84 form sliding bearing surfaces 87 and are provided with grease from said central lubricant aggregate via a channel 88. The excess grease penetrates out to the outwardly open space 89 between the connecting arm 25 and the table 15 and prevents impurities from penetration to the sliding bearing surfaces 87. Excess grease also penetrates to this space 89 from the space 81 outside the sliding plate 75 via an annular gap 90 and prevents impurities from penetrating down to the sliding bearing surfaces 79 on the lower side of the sliding plate 75. During operation the sliding plate 75 and sliding roller 85 rotate and the load from the feed unit 19 is taken up by the lubricated sliding bearing surfaces 79, 87. During normal operation these sliding bearing surfaces are lubricated with grease and well protected from impurities, thus giving minimum wear on the components. Should a malfunction prevent the feed unit 19 from performing its eccentric circular movement, the friction engagement will be released and the sliding roller 85 will slide on the sliding plate 75. Operation will therefore not be interrupted. The sliding roller 85 may alternatively be journalled in the feeding rings 22, 23 of the feed units previously described.

Since the feed unit 19 has several feeding elements 22, 23, 24 located radially outside each other, and since these are continuous, the feeding surfaces 28, 30 increase proportionally to the distance from the center of the table. The embodiments described enable material to be fed from all points of the bottom area of the column of material during a cycle of movement of the feed unit 19. Furthermore, the area of the feeding surfaces which are active and in movement for feeding is constant during each phase (Δt) of the cycle of movement irrespective of the direction of the feeding surfaces 28, 30. By cycle of movement (or part thereof) is meant the time required for a certain point on the feeding surfaces to perform a full feeding movement from a starting position to the outlet gap 18 and then return to the starting position until the moment a new feeding movement is begun.

Motors can be used to operate the feed unit, instead of pneumatic or hydraulic cylinders. In the embodiment illustrated in FIGS. 3 and 4 the shaft of a motor may thus be connected to the shaft 54, either directly or via a suitable gear. In the other embodiments the cylinders may be replaced by motors, each driving a crank arm or the like corresponding to the piston rod 36.

The invention is not limited to the embodiments shown with a circular table and a feed unit which is turned around the center of the table, but is also applicable for square or rectangular tables, for instance, where the feeding elements are frame-like in shape and are moved in first and second or several to and fro movements in which the movements form angles of 90° with each other. Furthermore, the outlet gap 18 may be defined by two spaced edges of the table, i.e. the outlet gap is located between the periphery and the center of the table, the table being circular or rectangular in shape, preferably square.

With the expression "fixed table" is meant that the table has at least a main part which is stationary and that it can include a rotatable inner part as shown by one of the embodiments described above.

We claim:

1. An apparatus for feeding particulate material from a container of the type having a bottom having an opening, said apparatus comprising a table for location beneath the bottom of the container to receive the material under gravity flow onto said table from the opening, said table having an outer peripheral edge and a center, a feeding unit disposed on said table for movement toward and away from at least a portion of said outer peripheral edge, said feeding unit including at least one slide member carried on said table and having a first surface facing generally outwardly in a direction of movement toward said outer peripheral edge and a second surface facing generally inwardly in a direction of movement away from said outer peripheral edge, said first surface being shaped to engage and move material toward said outer peripheral edge to discharge material from the table and said second surface being shaped to minimize movement of material towards the center as said at least one slide member is moved generally away from said outer peripheral edge.

2. The apparatus as claimed in claim 1, wherein said apparatus includes drive means for moving said feeding unit continuously in altered directions of feed in relation to said outer peripheral edge and intermittently in altered directions of feed in relation to said outer peripheral edge.

3. The apparatus as claimed in claim 1, wherein said second surface of said at least one slide member is inclined relative to said table, said inclined surface sloping towards said center of said table.

4. The apparatus as claimed in claim 1, wherein said table is disposed at a selected vertical distance below said opening of the container to form a vertical peripheral gap therebetween, said container being of the type having a cross-sectional area less than the area of said table, said bottom of said container forming a housing being provided to surround said table with said table being imperforate between said outer peripheral edge and said center thereof.

5. The apparatus as claimed in claim 4, wherein said table is circular and said at least one sliding member further comprises a plurality of concentric feeding elements each having a said first surface and a said second surface, said-feeding elements being disposed at predetermined distances from each other, said at least one slide member further including connecting arms connecting said feeding elements for movement, said apparatus including drive means connected to said connecting arms for moving said connecting arms in an eccentric circular movement about the center of said table whereby an arbitrary point on said feeding elements moves in a corresponding circle with a radius corresponding to a predetermined distance to urge material towards said outer peripheral edge.

6. The apparatus as claimed in claim 5, wherein said feeding unit further includes a centrally placed feeding disk disposed concentric with respect to said feeding elements for feeding material from the center of said table.

7. The apparatus as claimed in claim 6, wherein a counter ring is secured to said table concentrically with the center of said table and located radially interiorly of each said feeding element, said counter ring having a substantially vertical counter-surface facing in the direction of said first surfaces of said feeding elements to prevent material from moving towards said center of said table whenever a portion of one of said feeding elements moves towards said counter-surface, said counter ring being provided with an inclined slide surface facing the center of said table.

8. The apparatus as claimed in claim 7, wherein said drive means comprises at least two power cylinders disposed horizontally below said table.

9. The apparatus as claimed in claim 8, wherein each power cylinder has a piston rod extending below said table and connected to said feeding unit by at least one eccentric drive member, said at least one eccentric drive member being disposed adjacent to said center of said table.

10. The apparatus as claimed in claim 9, wherein said at least one eccentric drive member has an upper vertical pin on which said feeding unit is rotatably journaled.

11. The apparatus as claimed in claim 7, wherein said drive means includes at least two power cylinders disposed horizontally in said housing, each said power cylinder including a piston rod extending vertically above said table, each piston rod being connected to a vertical pivot pin, so that, when each piston is activated in sequence, intermittently, said respective power cylinder will sequentially move said feeding unit in said eccentric circular movement.

12. The apparatus as claimed in claim 1, wherein friction-reducing means are disposed between said feeding unit and said table, said friction-reducing means comprising circular sliding plates mounted on said table.

13. The apparatus as claimed in claim 12, wherein said sliding plates being rotatable on load-absorbing sliding bearing surfaces.

14. The apparatus as claimed in claim 13, wherein each sliding plate includes a sliding roller pivotally journaled and enclosed with a bushing in an enclosure with said bushing surrounding said sliding roller, said enclosure forming one of the load-absorbing sliding bearing surfaces, said sliding plate cooperating with a support plate located on said sliding plate to form another of the load-absorbing sliding bearing surfaces, a supply for lubricant, gaps being provided between said sliding plate and, said table to allow flow of lubricant from said lubricant supply onto said sliding bearing surfaces, said sliding roller and sliding plate having opposing surfaces in releasable frictional engagement with each other.

15. The apparatus as claimed in claim 14, wherein said container and a housing beneath said table are provided with ducts for a supply of fluid for treating the particulate material.

16. The apparatus as claimed in claim 15, wherein said container constitutes a chip bin and means are provided for connecting said ducts with said supply of fluid of one of steam, or moist, heated air for steaming the chips.

* * * * *